United States Patent Office 2,945,650
Patented July 19, 1960

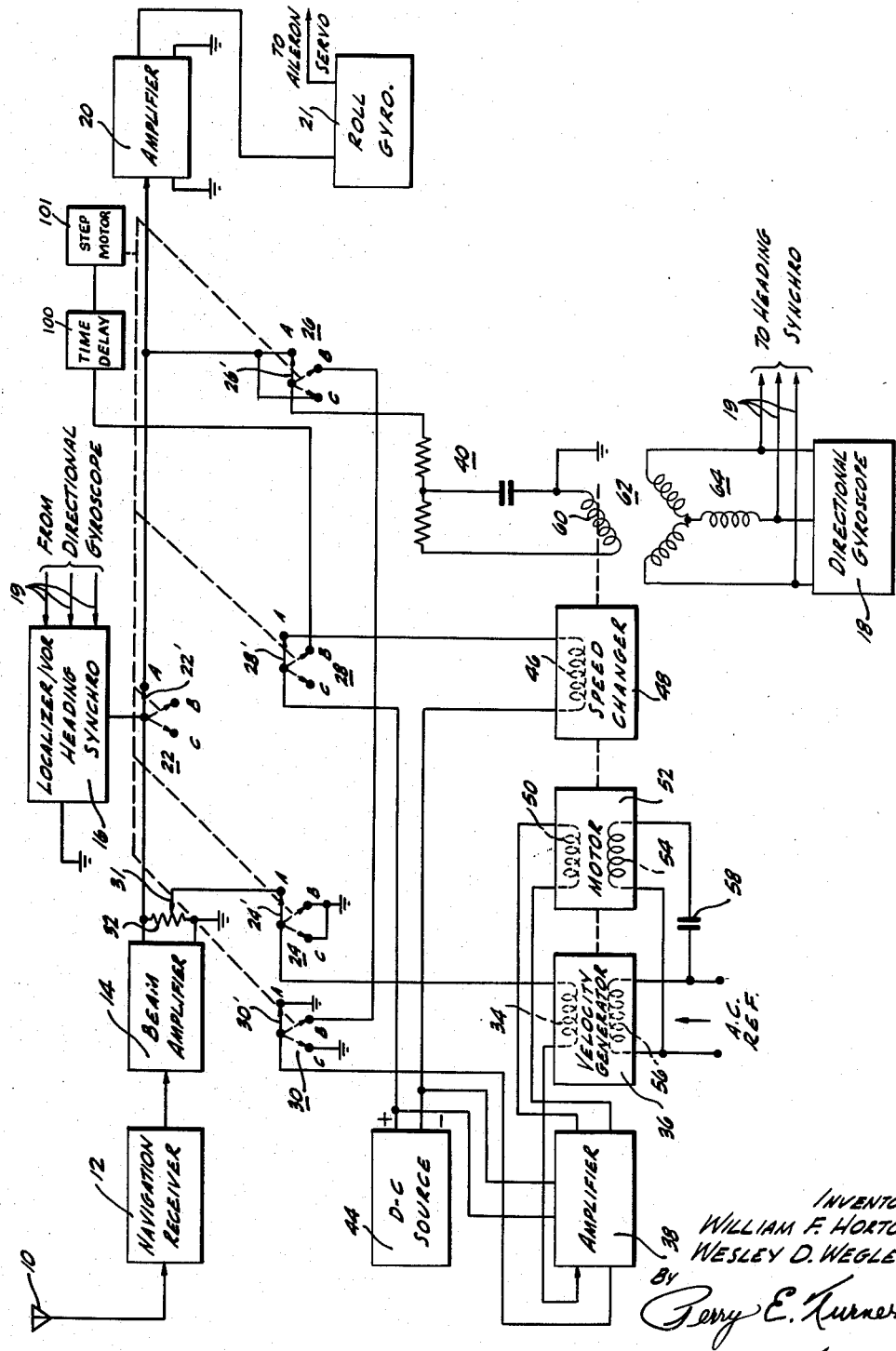

2,945,650
AUTOMATIC HEADING CONTROL FOR AIRCRAFT

William F. Horton, Malibu, and Wesley D. Wegley, Canoga Park, Calif., assignors to Lear, Incorporated Filed June 28, 1957, Ser. No. 668,803

7 Claims. (Cl. 244—77)

This invention relates to automatic pilots for aircraft, and more particularly to an improved autopilot roll control means for controlling the flight path of an aircraft.

As is well known, the flight path of an aircraft may be controlled in response to the output of a navigation receiver, which may be a localizer signal representing a landing beam or a VOR signal used in cross-country flying, or the aircraft may be flown to a constant heading. In these different modes of control—beam signal and heading-hold—respective apparatus develops the signals necessary to control the ailerons, one being used in conjunction with the beam signal and the other functioning as a synchronizer to facilitate maintenance of a predetermined heading. Such multiplicity of components obviously contributes materially to the overall cost of an autopilot system, and severely taxes space and weight requirements of modern aircraft.

It is an object of this invention to provide simplified apparatus for the roll channel of an autopilot, through which heading synchronization and lateral integration are accomplished.

It is another object of this invention to provide an improved roll control channel for an autopilot, which utilizes a minimum number of components for producing heading control signals in different modes of heading control.

It is a further object of this invention to provide flight path control means having multi-function apparatus comprising a minimum number of component parts of simple design and rugged construction, by which a considerable saving in size, cost and weight is realized over prior art autopilot systems.

The above and other objects and advantages of this invention will become apparent from the following description taken in conjunction with the accompanying drawing, in which a preferred embodiment is illustrated by way of example. The scope of the invention is pointed out in the appended claims.

In the drawing,

The sole figure is a block diagram of a system for developing signals to control the heading of an aircraft, in accordance with this invention.

Referring to the drawing, localizer or VOR signals (defining a "beam" heading) are impressed upon an antenna 10 and are applied to a navigation receiver 12 which develops an output or "beam" signal which is amplified by a beam amplifier 14. A heading synchro 16, which is used to select the bearing of the localizer or VOR signal, develops an output signal corresponding to the difference between the selected heading, i.e., the heading represented by the position of its rotor (not shown), and the actual heading; a three-wire connection 19 is made from the directional gyroscope 18 to the stator of heading synchro 16, all in a conventional manner.

When the aircraft is to be flown in response to a localizer or VOR signal, it is desired to connect the outputs of the heading synchro 16 and beam amplifier 14 to a path amplifier 20, which is coupled through a roll gyroscope 21 to a servo mechanism for controlling the ailerons (not shown). In the presence of cross-wind, the outputs of the heading synchro and beam amplifier are not sufficient to fly the aircraft along the beam. In such a situation, the aircraft would reach a point where it would fly displaced from the beam and at an angle with respect thereto, i.e., it would "crab"; further, the outputs of the beam amplifier 14 and heading synchro 16 would be equal and opposite, so that a signal from these two sources to the path amplifier 20 would be zero. Accordingly, in a cross-wind condition, it is desired to apply to the input of path amplifier 20 a signal which is proportional to the integral of any signal appearing in the output of beam amplifier 14, whereby the aircraft while crabbing is flown along the center of the beam. Finally, if any particular heading is to be held automatically, it is desired first to remove any signal from the input of path amplifier 20 which might cause corrective action of the ailerons to maneuver the aircraft to other than the desired heading.

To accomplish the foregoing, a plurality of switching devices 22, 24, 26, 28 and 30 are employed, each having three contacts or positions, A, B, C for engagement by their respective switch arms 22', 24', 26', 28' and 30'; these switch arms are ganged for simultaneous operation as indicated. For switch 22, contact A is connected to the input of path amplifier 20, contacts B and C are floating, and switch arm 22' is connected to the output of beam amplifier 14. For switch 24, contact A is connected to the sliding contact 31 of a potentiometer 32 which is connected across the output terminals of beam amplifier 14, contacts B and C are connected to a point of reference or ground potential, and switch arm 24' is connected to one end of the signal winding 34 of a velocity generator 36; the other end of winding 34 is connected to the input of an amplifier 38. The A and C contacts of switch 26 are directly connected, and a direct connection is provided therefrom to the input of path amplifier 20. The B contact of switch 26 is directly connected to the B contact of switch 30, and switch arm 26' is connected to the output of an RC network 40. The switch arm 28' of switch 28 is connected to the positive terminal of a D.-C. source 44; its A contact is connected through the energizing coil 46 of a speed changer 48, which is a two-speed clutch, to the negative terminal of D.-C. source 44, and its B and C contacts are floating. For switch 30, contacts A and C are connected to ground potential, and switch arm 30 is connected to the input of amplifier 38.

The output of amplifier 38 is connected to the control winding 50 of a two-phase motor 52. The reference winding 54 of motor 52 and the remaining winding 56 of velocity generator 36 are energized from an A.C. reference source as indicated; a capacitor 58 insures that the voltage across the reference winding 54 will be 90° out of phase with voltages appearing across the control winding 50 of motor 52. Motor 52 drives the velocity generator 36 and also the speed changer 48. The speed changer is adapted to vary the position of the rotor and rotor winding 60 of a synchro device 62, the stator winding 64 of which is connected to the three-wire output of directional gyroscope 18.

For localizer or VOR beam operation, and to effect cross-wind compensation, the switch arms of the switches are connected to their respective A positions as shown. Since the velocity generator 36 measures the speed of operation of motor 52, a signal is applied through winding 34 of the velocity generator to the input of amplifier 38 which is proportional to the speed of the motor. Amplifier 38 thus compares the beam signal and the velocity of the velocity generator. Therefore, the speed of the motor is proportional to the integral of the beam signal. Accordingly, the voltage appearing across the rotor winding 60 of synchro 62 is proportional to the integral of the beam signal, and such voltage, which represents a persistent cross-wind error, is applied to path amplifier 20. Actuation of the ailerons in response to the corresponding output of path amplifier 20 and roll gyroscope 21 will cause the aircraft to fly to the center of the beam, whereupon the output of beam amplifier 14 is reduced to zero. Thereafter, the only persisting or steady-state signal applied to the path amplifier 20 is the output of synchro 16, in response to which the ailerons are positioned to maintain the aircraft at the necessary crab angle.

For the heading-hold condition, switch arms 22', 24', 26', 28' and 30' are in their C positions. It will be seen from inspection that in so connecting the switches, the beam amplifier 14 and heading synchro 16 are disconnected from path amplifier 20, sliding contact 31 is disconnected from velocity generator 36, and the input to amplifier 38 is effectively shorted to ground. Thus, for heading-hold, only the rotor winding 60 (through RC network 40) is coupled to the input of path amplifier 20; any change in the heading at the instant of switching is reflected in a voltage across rotor winding 60, in response to which the ailerons are manipulated to return the aircraft to such heading and reduce such voltage to zero.

However, if any signal exists in the output of beam amplifier 14 at the time the switch arms are moved from their A positions, a signal will exist in the output of RC network 40 which will be acted upon to cause the aircraft to be maneuvered to a different heading than that existing at the time the switches were thrown from the A positions. Accordingly, it becomes necessary that any signal existing in the output of RC network 40 be reduced to zero before the switch arms are finally placed in their C positions. Therefore, in the B positions of the switches, and in accordance with this invention, only the output of RC network 40 and the winding 34 of velocity generator 36 are connected to the input of amplifier 38. A resulting difference voltage is applied to the control winding 50 of motor 52, which operates in a direction to position rotor winding 60 so that the output of RC network 40 is reduced to zero.

To accomplish this synchronization, the switch arms of the various switches are first thrown from the A contacts to the B positions, where they are held for a long enough time to permit the required synchronization to take place, and the C contacts are thereafter completed to effect the heading-hold condition above described. Thus, in changing from beam control to heading-hold, the switching sequence is from the A contacts to the B contacts, the B positions being held for a predetermined delay period, and then switching to the C contacts. The switching and delay may be controlled manually, of course; preferably, however, this is done automatically. Such automatic switching may be accomplished with stepping switches, or by means of time delay networks. It will be recognized that the switch arrangement here shown and described is merely illustrative, and that other switching devices and switch connections, including relays and time delay networks, are obviously embraced by this invention. For example, a step motor 101 connected to advance the switches from position B to position C may be energized from position B of switch 28, as shown, through time delay circuit 100 of any well-known type.

From the foregoing, it will be apparent that this invention provides a greatly simplified system for heading synchronization and lateral integration, wherein the same elements are used for both integrating and synchronizing functions. It permits a considerable reduction in the cost of producing an autopilot, without sacrifice of the safety and efficiency required of modern autopilots. An autopilot utilizing the combined heading synchronizer and lateral integrator of this invention is a smaller package than heretofore known, and it is lighter than presently known autopilots.

What is claimed is:

1. In an automatic pilot having command means for controlling the heading of an aircraft, navigational apparatus comprising radio apparatus developing signals representing the lateral departure of said aircraft from a predetermined beam heading path, a directional gyroscope, cross-wind compensation means of the type capable of developing an output signal proportional to the integral of its input and capable of operating as a synchronizer to reduce its output signal to zero when no input is supplied thereto, switching means connected to said cross-wind compensation means operable in a first position to effect operation of said cross-wind compensation means as an integrator and in a second position to effect operation of said cross-wind compensation means as a synchronizer, means to develop a signal representing the difference between beam heading and any actual heading, said switching means being connected so that in said first position the heading of the aircraft is controlled in response to the output from said cross-wind compensation means together with the radio beam signal and the signal from said difference signal developing means, and in said second position in response to signals from said directional gyroscope.

2. A system in accordance with claim 1, wherein said cross-wind compensation means has an output circuit including the rotor winding of a synchro device, a stator winding for the synchro device coupled to the directional gyroscope, and motor means to position said rotor in the first position of said switching means to develop across said rotor winding the signal which is proportional to the integral of the beam signal.

3. In an autopilot, heading control means for operating aileron surfaces of an aircraft comprising means to develop signals representing displacement of the aircraft from a radio beam, means including a directional gyroscope to develop signals representing the difference between the heading on which the beam is located and the actual heading of the aircraft, a network to develop signals proportional to the integral of the beam signal, switching means having first, second and third positions and being so constructed and connected that upon being moved from said first position to pause on said second position automatically for a predetermined delay period and to automatically switch to said third position after said delay period, said switching means being so connected that in its first position it causes said beam signal to be applied to said network and the output of said network to be applied to said heading control means together with the beam signal and the signal representing the difference between the beam heading and the actual heading, and in said second position decoupling said aforementioned signals from said heading control means and decoupling said beam signal from said network, said switching means in said second position also coupling the output of said network to the input thereof, said network in said second position being adapted to operate as a synchronizer to reduce signals appearing in its output circuit to zero, and said switching means in said third position coupling the output of said directional gyroscope to said heading control means.

4. In an aircraft autopilot heading control system for operating the ailerons of an aircraft to control its flight path, a navigation receiver for producing a beam signal, a directional gyroscope, a synchro device coupled to the directional gyroscope for developing signals representing the difference between the beam heading and the actual heading of the aircraft, a synchro having a stator winding coupled to the directional gyroscope, a rotor and winding supported thereon, electro-mechanical means responsive to the beam signal to position said rotor so that a voltage is established across said rotor winding which is proportional to the integral of the beam signal, said electro-mechanical means having an input circuit adapted to be switched from said navigation receiver to said rotor winding, said electro-mechanical means being operable when coupled to said rotor winding to position said rotor so that no voltage appears across said rotor winding, switching means so connected and operable that when the input circuit of said electro-mechanical means is coupled to the navigation receiver as to effect utilization of the combined outputs of the navigation receiver, synchro device and rotor winding to operate the ailerons, said switching means being operable when the input circuit of said electro-mechanical means is connected to said rotor winding to prevent utilization of the outputs of either the navigation receiver, synchro device or rotor winding, and said switching means being operable after the voltage across said rotor winding is reduced to zero by said electro-mechanical means to permit only the output signals of the directional gyroscope appearing across said rotor winding to be utilized to operate the ailerons.

5. In an aircraft having ailerons, heading control means for operating the ailerons, means to command said heading control means including a navigation receiver to develop signals representing a radio beam, a directional gyroscope, synchro means coupled to said gyroscope to develop signals representing the difference between the beam heading and the actual heading of the aircraft, a synchro device having a stator winding coupled to said directional gyroscope, switching means, a rotor for said synchro device supporting a winding coupled to said switching means, electro-mechanical means coupled to said rotor and responsive to the output of said receiver to orient it to a position to develop a signal across the winding thereof proportional to the integral of the beam signal, a second switching device connected for selectively coupling the beam signal to said electro-mechanical means, third switching means connected for selectively coupling the outputs of said navigation receiver and said synchro means to said heading control means, each of said switching means having respective first positions in which said navigation receiver is coupled to said integrating means and said navigation receiver, synchro means and rotor winding are coupled to said heading control means, said switching means each having a second position in which said heading control means is disconnected from the receiver, synchro means and rotor winding, said electro-mechanical means is disconnected from said receiver, and said rotor winding is connected to the input of said electro-mechanical means, each of said switching means having still a third position in which only said rotor winding is connected to said heading control means, said electro-mechanical means in the second positions of said switching means functioning as a synchronizer to position said rotor so that any signal across said rotor winding is reduced to zero, and said switches being characterized by automatic operation upon being switched from said first positions to pause at said second positions for a predetermined period to permit any signal appearing across said rotor winding to be reduced to zero, said switching means after said predetermined period automatically switching to said third positions, whereby in said third position of said switching means said heading control means operate ailerons under control of said directional gyroscope to maintain the aircraft on a constant heading.

6. In an autopilot having a directional gyroscope, navigation receiver, heading synchro and aileron command means, a synchro device having a stator connected to the directional gyroscope, said synchro device having a rotor and a winding supported thereon, said rotor winding being electrically coupled to said stator, electromechanical means adapted to develop in said rotor winding a voltage proportional to signals from the receiver, switching means in a first position providing connections simultaneously from the receiver to said electro-mechanical means and from the receiver, heading synchro and rotor winding to the command means, said switching means in a second position connecting only said rotor winding to the command means, means operable upon switching from said first position to delay for a predetermined period the control of the command means through the rotor winding alone, means to connect said rotor winding to said electro-mechanical means during the delay period, and said electro-mechanical means during said delay period positioning said rotor so as to reduce any voltage across said rotor winding to zero.

7. In an autopilot having a roll channel and means responsive to command signals for operating the ailerons to control the flight path of the aircraft, wherein the command signals in one mode of heading control may comprise a beam signal from a navigation receiver, a heading synchro signal and a cross-wind compensation signal which is proportional to the integral of the beam signal, and wherein the command signals in a second mode of heading control comprise signals from a directional gyroscope for maintaining the aircraft on a constant heading, a system for controlling the aileron-operating means comprising a synchro device having a stator energized from the directional gyroscope, a rotor for the synchro device supporting a winding, motor means coupled to said rotor, control means connected to said motor means to operate said motor means in response to the beam signal to cause a voltage to be developed across said rotor winding which is proportional to the integral of the beam signal, switching means so connected that it is in one position operable to simultaneously connect the navigation receiver, heading synchro and rotor winding to the aileron-operating means and to connect the receiver to said control means, said switching means upon being actuated from said one position to a second position automatically breaking the aforementioned connections and connecting said rotor winding to said control means for a predetermined period, said control means during said period operating said motor and said rotor to reduce any signal across the rotor winding to zero, and said switching means in said second position, and following said predetermined period, automatically connecting only said rotor winding to the aileron-operating means.

References Cited in the file of this patent

UNITED STATES PATENTS 2,613,352  Kellogg _____ Oct. 7, 1952